May 20, 1969     R. C. HUNGERFORD ET AL     3,444,868

LENS WASHING MACHINE

Filed Sept. 22, 1966

INVENTORS
RICHARD C. HUNGERFORD
BY FRANK E. BROWN

*Eckhoff & Slick*

ATTORNEYS

# United States Patent Office 3,444,868
Patented May 20, 1969

3,444,868
LENS WASHING MACHINE
Richard C. Hungerford, Sunnyvale, and Frank E. Brown, Burbank, Calif., assignors to Barnes-Hind International, Inc., a corporation of California
Filed Sept. 22, 1966, Ser. No. 581,253
Int. Cl. B08b 3/02
U.S. Cl. 134—143                  3 Claims

ABSTRACT OF THE DISCLOSURE

A washing device for contact lenses is provided having a piston with a pair of cavities therein with a cover member which is hinged at the center to provide an individual cover for each of the cavities with holes through the piston and cover member and with means for holding the cover member in contact with the piston whereby the piston can be reciprocated in a fluid, providing a jet washing action over the surfaces of the contact lenses.

---

This invention relates to a cleansing device, and more particularly, relates to an improvement in the cleansing devices for contact lenses, shown in our prior patents, 3,139,097 and 3,139,098.

In our prior patents we described and claimed lens cleaning devices wherein a composite piston is employed within a vessel containing a cleansing solution, the composite piston having cups for holding the lenses. In each of the structures described and claimed, the composite piston comprised one section having two cups, each of which was adapted to hold a contact lens, and a second section having a substantially flat face, which fit against the cups of the first section, holding the lenses within their respective cups. Although such devices are highly successful in the cleansing of contact lenses, they do suffer from one defect. If the lenses are placed in the cups with the concave side toward the flat section of the piston, there is always the possibility that the lenses will adhere to the flat section. The marginal edges of contact lenses are very thin, and if a lens adheres to the flat section and the two sections of the piston are turned relative to each other, there is the slight possibility that the edge of the lens will wedge between the sections of the piston, and as turning continues, the lens may be cracked.

In accordance with the present invention a modified form of cleansing device is provided which renders it substantially impossible for a lens to be injured.

It is therefore an object of the present invention to provide a contact lens cleansing device which gives a thorough cleaning action yet wherein there is no danger of injuring a lens.

Another object of this invention is to provide a contact lens cleaning device having a concavity for holding each lens but wherein the cover for the concavity does not rotate, therefore obviating the possibility of wedging a lens between the cover and the body of the piston.

Still another object of this invention is to provide a cleaning device for contact lenses having a pair of cover elements for the individual chambers holding the lenses wherein said cover elements are positive in action, easy to work, and are provided with a selective lock whereby only one of the two chambers can be opened at one time.

Still another object of this invention is to provide a holder for contact lenses wherein one can sense the location of the right and left lens by touch.

Other objects will be apparent from the balance of the specification which follows.

In the drawings forming part of this application, FIGURE 1 is a perspective view of a lens cleaning device embodying the present invention.

Figure 1:
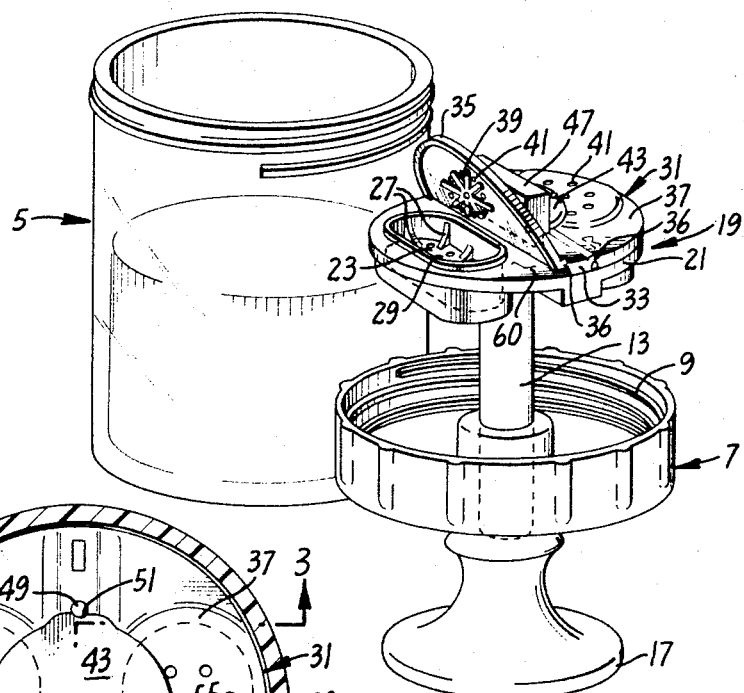

Referring now to the drawings by reference characters, the washing device comprises a cup-like receptacle 5 which is preferably made of a clear plastic such as polyethylene. The device has a cover 7 which is preferably fastened to the cup 5 by means of mating threads 9 although other means of attachment can be used, such as a mating lip and notch so that the cover may be merely snapped into place. At the center of the cover 7 is mounted a piston rod 13 for reciprocation through the cover. Piston rod 13 is provided with a handle 17 at one end thereof so that it may be easily grasped. Handle 17 is preferably large enough to provide a suitable base for the assembly so that it can stand on a table when inverted. The opposite end of piston rod 13 is provided with a piston designated 19 which piston is preferably of a soft plastic such as polypropylene or polyethylene so that danger of scratching of the lenses is obviated. Piston 19 includes a disc 21 which has a pair of concavities 23 and 25 therein. Preferably each of these concavities has a series of ridges 27 therein so the contact lens will not lie flat on the bottom but will be supported at spaced points above the bottom of the concavity.

The bottom of the concavity is also provided with a series of holes 29 of relatively small diameter so that liquid will flow therethrough at a high rate of speed giving a jet cleaning effect as described in our prior patents.

Mounted over the piston 19 is a cover assembly generally designated 31. Cover assembly 31 comprises a central portion 33 to which are connected the flaps 35 and 37. Flaps 35 and 37 are adapted to overlie the concavities 23 and 25 in sealing relationship. The lines 36 between the flaps and the central portion 33 are of reduced cross section, forming a flexible hinge. The flaps have a series of ridges 39 to prevent the lens from adhering to the flat surface of the flap and are also provided with holes 41 for the passage of cleaning fluid to give the jet cleaning effect. Naturally, the holes 41 in the flap are complementary to the holes 29 in the concavity although it is not at all necessary that they be in alignment.

Figure 2:
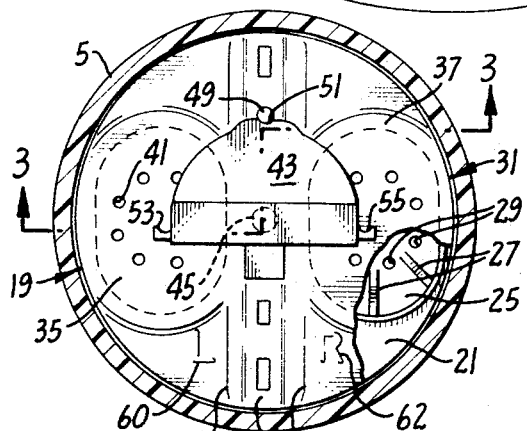
FIGURE 2 is a bottom plan view, partly in section of the device shown in FIGURE 1.
Figure 3:
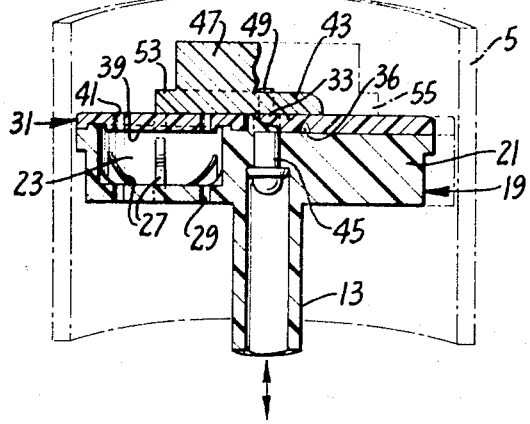
FIGURE 3 is a section on the line 3—3 of FIGURE 2.
Figure 4:
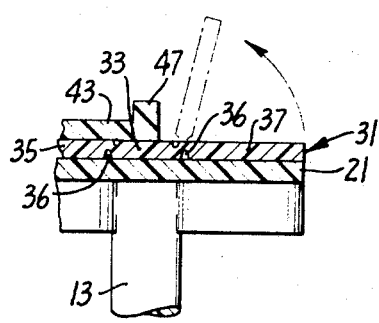
FIGURE 4 is a partial view illustrating the hinge and locking member.

In order to provide a positive opening and closing means for the device, member 43 is pivoted on pin 45 to the rod 13. As can best be seen from FIGURE 2, the member 43 is in the form of a half disc with its pivot pin substantially where the center of the disc would be if the disc were complete. The member 43 also includes an upstanding handle portion 47 so that it can be readily turned. A pin 49 stands upwardly from the center member 43 and a complementary detent notch 51 is provided on member 43 so that when the member 43 is turned to its central position, the notch 51 will engage the pin 49 holding the member in place in which position it will be effective to keep both of the flaps 35 and 37 closed. In addition, hooks 53 and 55 are provided at each end of the closing member 43 to limit rotation to 90° in each direction. Thus, there is no time when both of the flaps can be opened; either are both locked or at least one is locked. This action is perhaps best shown in FIGURE 4 where the member 43 is shown holding the flap 35 in place but allowing the flap 37 to be raised to the position shown in phantom.

In order to insert or remove a lens, it is only necessary to turn the member 43 in one direction or the other. For instance, if one wishes to insert a lens and the parts are in the position shown in FIGURE 2, to insert the right lens one would merely grasp the handle 47 turning the member 43 90° counterclockwise which would release the flap 37 allowing the lens to be placed in the concavity. The member 43 would then be turned 180° clockwise, now securing the flap 37 and releasing flap 35 thus allowing the left lens to be put into the left cavity. The member 43 would then be rotated 90° counterclockwise to lock the device. Of course, the reverse sequence of operation would be followed in removing the lenses.

Normally such lens washing devices are provided with suitable indicia such as the letters "L" and "R" as at 60 and 62 but it will be apparent that because of the shape of the member 43 and its relationship to the pin 49, it is quite easy for a person of highly impaired vision to orient the device purely by feel.

It is believed apparent from the foregoing that we have provided an effective form of contact lens washer which is fool-proof in action and which renders it substantially impossible to injure a contact lens. Many variations can be made in the exact structure shown without departing from the spirit of our invention.

We claim:

1. In a lens washing device:
   (a) piston member;
   (b) a pair of oppositely disposed concavities in said piston, each of which is adapted to receive a contact lens;
   (c) a cover member having a pair of hinges disposed near the middle of said piston providing a pair of flaps, one flap covering each of said concavities,
   (d) means for releasing and for holding said flaps in contact with the piston whereby said lenses are released when a flap is up and are held securely individually in said concavities when a flap is down said means comprising rotatable means above said flap releasing only one flap at a time, and
   (e) small holes in the piston and flaps whereby a jet washing action is produced on lenses held in the concavities when the piston is reciprocated in a fluid.

2. In a lens washing device:
   (a) piston member;
   (b) a pair of oppositely disposed concavities in said piston, each of which is adapted to receive a contact lens;
   (c) a cover member having a pair of hinges disposed near the middle of said piston providing a pair of flaps, one flap covering each of said concavities,
   (d) means for releasing and for holding said flaps in contact with the piston whereby said lenses are released when a flap is up and are held securely individually in said concavities when a flap is down,
   (e) small holes in the piston and flaps whereby a jet washing action is produced on lenses held in the concavities when the piston is reciprocated in a fluid, and
   (f) said means for holding the flaps comprising a member partly overlying the cover and having a pivot at one edge thereof, said pivot being attached between the two flaps whereby said member can be turned to a center position holding down both flaps or can be turned 90° in one direction or the other, selectively releasing the flaps.

3. The structure of claim 2 wherein the member is in the form of a half disc pivoted at its projected center with stop hooks at each edge of the disc and a detent notch at the center of its curved portion and wherein a pin projects from the cover and selectively engages the detent notch or one of the hooks whereby the member can be locked in its center position by the detent notch and is prevented from turning more than 90° in either direction by one of the hooks engaging said pin.

References Cited

UNITED STATES PATENTS

| | | | |
|---|---|---|---|
| 1,638,835 | 8/1927 | Davis | 134—145 |
| 3,025,950 | 3/1962 | Nathan | 206—5 |
| 3,139,098 | 6/1964 | Hungerford et al. | 134—145 |
| 3,343,657 | 9/1967 | Speshyock | 206—5 |

FOREIGN PATENTS

| | | |
|---|---|---|
| 583,462 | 10/1924 | France. |
| 156,679 | 11/1904 | Germany. |

ROBERT L. BLEUTGE, *Primary Examiner.*

U.S. Cl. X.R.

134—145, 197; 206—5